Sept. 6, 1938.  R. B. MORSE  2,129,181
LIQUID PURIFICATION PLANT
Filed April 11, 1934  6 Sheets-Sheet 1

Fig. 1.

Sept. 6, 1938.  R. B. MORSE  2,129,181
LIQUID PURIFICATION PLANT
Filed April 11, 1934  6 Sheets-Sheet 4

Inventor
Robert B. Morse,
By Dwight B. Galt
Attorney

Sept. 6, 1938.　　　　　R. B. MORSE　　　　　2,129,181
LIQUID PURIFICATION PLANT
Filed April 11, 1934　　　6 Sheets-Sheet 6

Fig. 7.

Robert B. Morse, Inventor
By Dwight B. Galt, Attorney

Patented Sept. 6, 1938

2,129,181

UNITED STATES PATENT OFFICE 2,129,181

LIQUID PURIFICATION PLANT

Robert B. Morse, Hyattsville, Md.; Carrie E. Morse administratrix of said Robert B. Morse, deceased Application April 11, 1934, Serial No. 720,107

25 Claims. (Cl. 210—12)

This invention relates to liquid purification apparatus, and while it is directed primarily to means for treating raw water for drinking and domestic purposes, it will be understood that its use is not to be thus restricted, as with possible alterations of a minor nature it may be efficiently used in the treatment of sewage and heavier polluted liquids, such as industrial waste, etc.

An important object of the invention is to provide a water purification plant of extremely flexible nature so as to lend itself to different topographic conditions; which economizes space and materials in its construction, and which, while a complete unit in itself, may be effectively utilized as one of a series of associated purification units of either similar or different construction.

A further object is to provide apparatus of such character as to afford in a limited space a maximum of sedimentation, coagulation and filtration area, as well as means for accurately governing turbulence and speed of flow of liquid in such areas.

A further object is to provide a purification apparatus characterized by a single structure featuring separate and distinct units, each including complete purification and pure water storage means, whereby such units may be alternately used and drained at times when repair becomes necessary without appreciably impairing the operation of the apparatus or materially affecting its capacity.

A further object is to provide a liquid purification apparatus including means whereby the entire structure may be easily, quickly and by simple operations cleaned of all impurities, sediment, etc., without the necessity of the apparatus remaining inactive any appreciable time.

With these objects in view, together with others which will appear as the description proceeds, the invention consists in the novel construction, combination and arrangement of parts, all as will be described more fully hereinafter, illustrated in the drawings, and particularly pointed out in the claims.

In the drawings:—

Figs. 1–1a is a plan view of a liquid purification apparatus disclosing a preferred arrangement, parts being broken away to show underlying structures, Figs. 2–2a is a vertical section taken substantially upon line 2—2 of Fig. 1, Figs. 3–3a is a similar section taken upon line 3—3 of Fig. 1.

In the preferred embodiment of the invention here disclosed, all apparatus incident to complete purification of liquid, as well as a pure liquid storage compartment, is included in compact form and in small area.

The several basins or compartments required in the structure may be formed by walls of steel, concrete or composition materials, and while the present illustration discloses the plant as circular in plan it will be understood that it is not necessarily limited to such shape, as it may assume oval, rectangular, hexagonal or other shapes as desired or required. The walls separating the several compartments are disclosed as concentric, but it will be understood that such arrangement need not be adhered to, as other plans or arrangements may be adapted to more desirably locate various parts of the apparatus or the control house.

The preferred liquid treatment apparatus includes a preliminary sedimentation chamber 10, a coagulating-basin 11, a filter chamber 12 and a filtered water reservoir 13, all concentrically arranged. The structure also includes a central pipe vault 14, surmounted by a control house 15, and the several chambers and basins may or may not be covered as preferred. The chamber 10, basin 11, chamber 12 and reservoir 13 are provided with diametrically arranged partitions or walls P, (Fig. 1) dividing each into a pair of half-ring-shaped semicircular chambers or basins. While in some instances it is found desirable to thus divide these chambers or basins, it will be understood that this wall may be eliminated where occasion requires.

Figure 1:
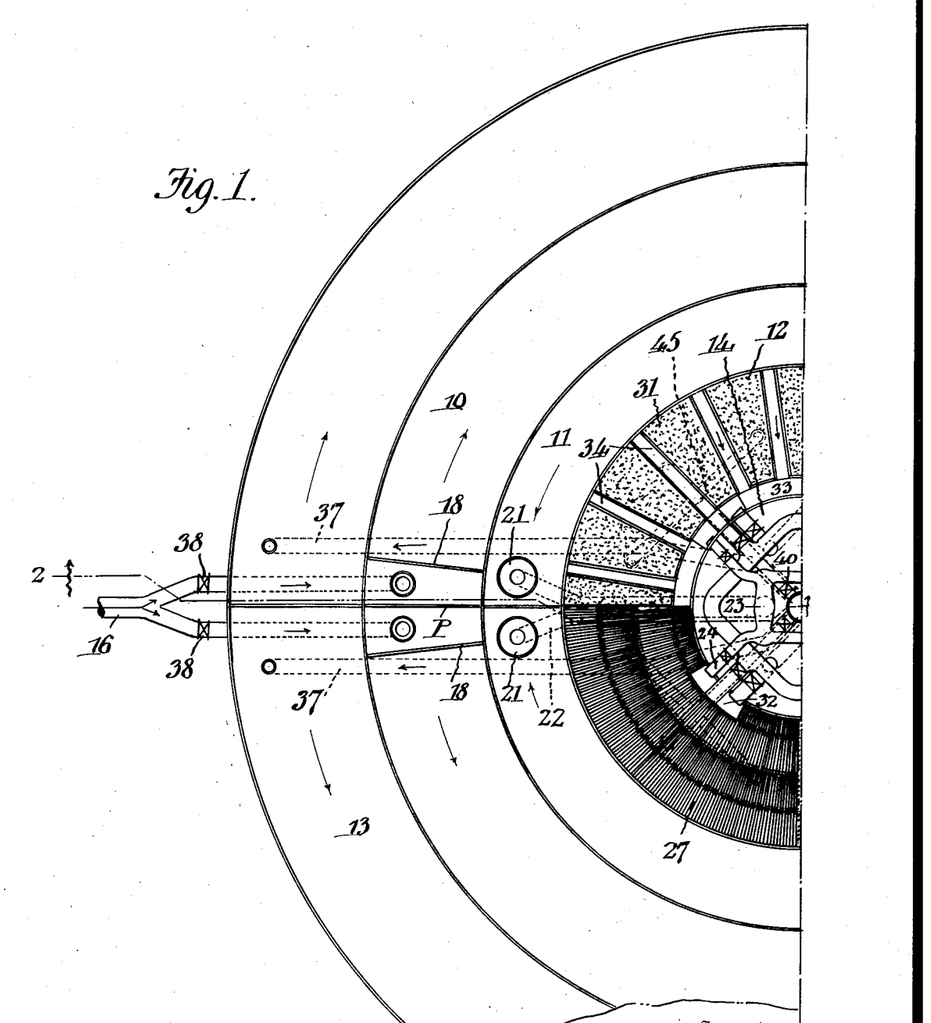
Figure 1A:
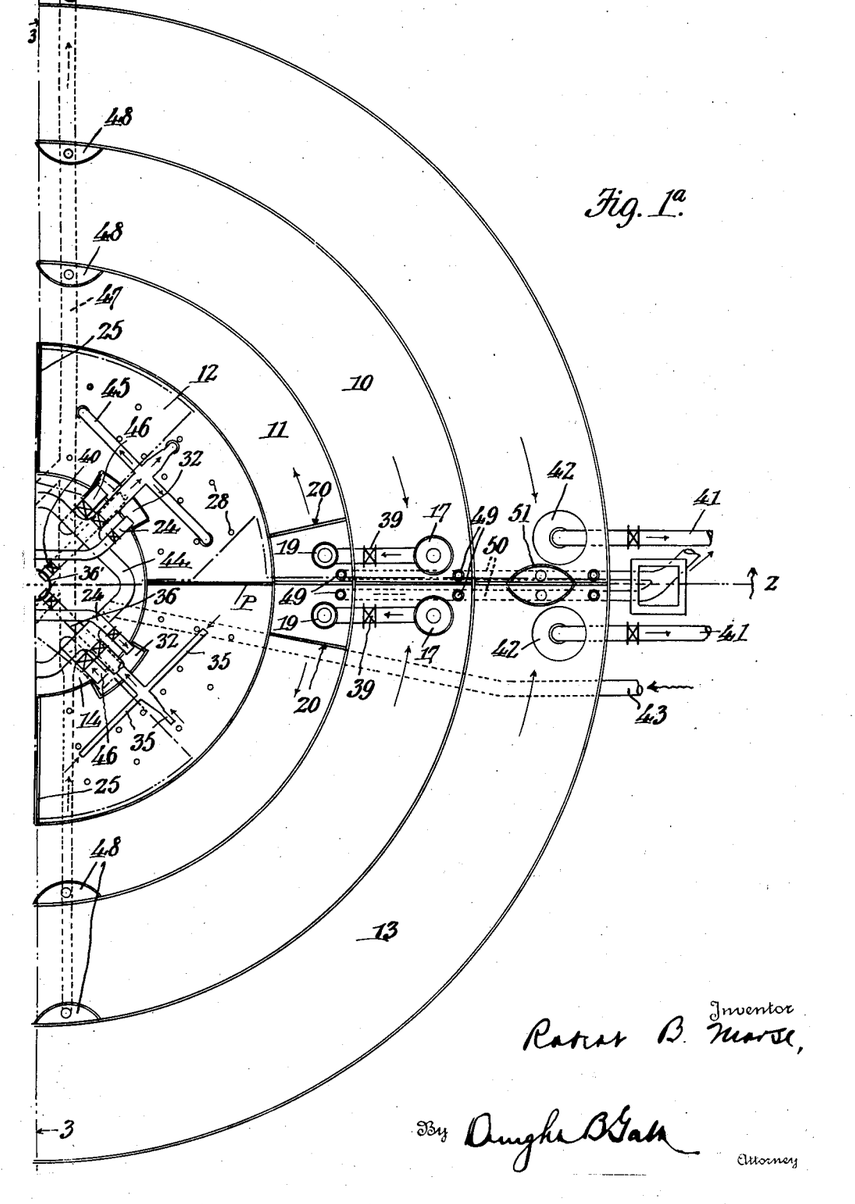
Figure 2:
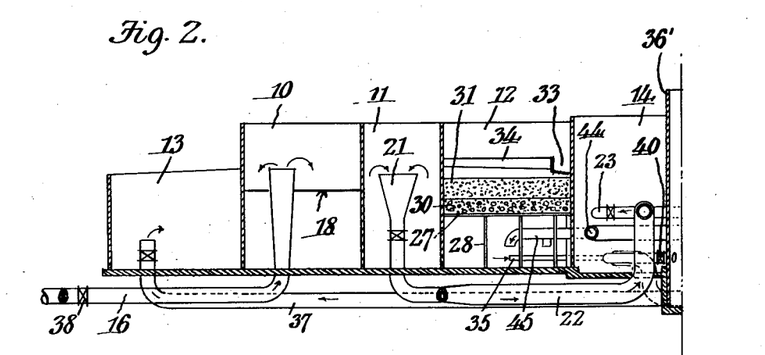
Figure 2A:
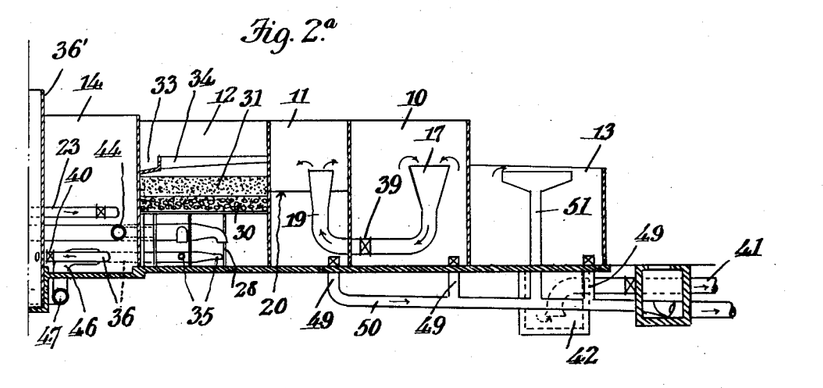
Figures 3, 5, 6:
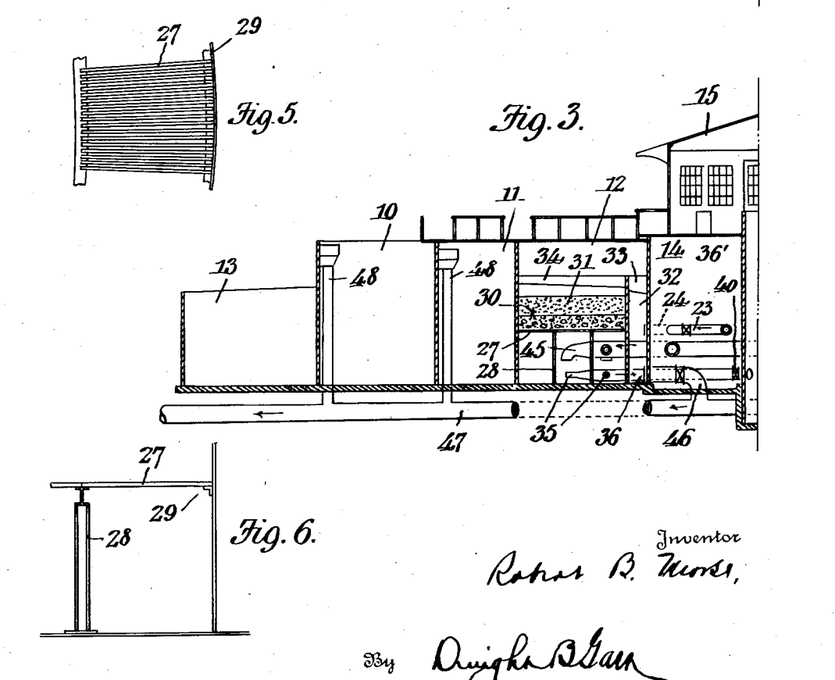
Fig. 5 is a detail plan view of one of the supports for the filter material.
Fig. 6 is a detail sectional view showing the manner of maintaining the same in proper position.
Figure 3A:
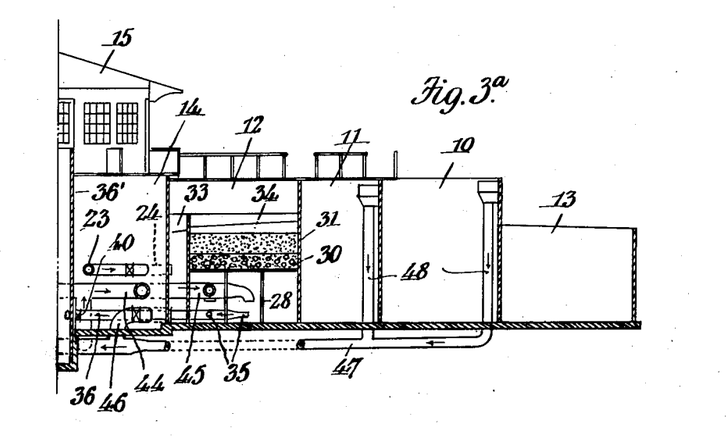
Figure 4:
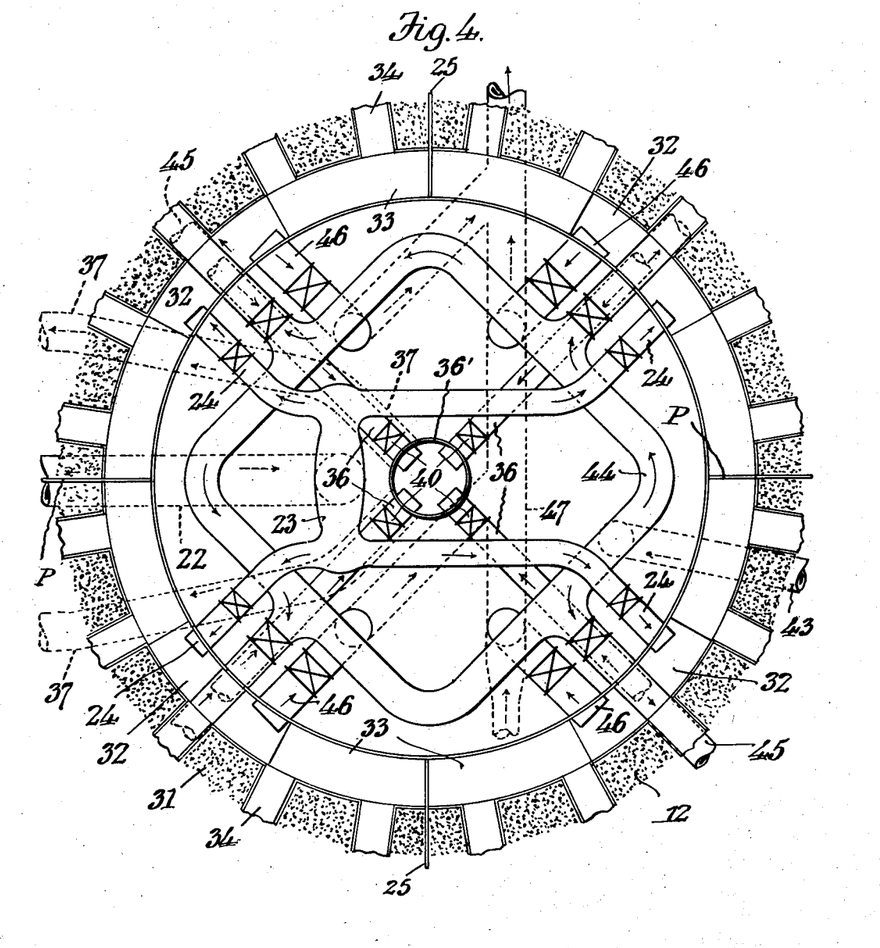
Fig. 4 is a slightly enlarged plan view showing the pipe arrangement employed in carrying forth the invention as disclosed by this preferred structure.

The raw water or liquid to be treated passes into the preliminary sedimentation chamber 10 through main 16, the latter being divided as shown in Fig. 1 so that each compartment of said chamber may be supplied. The inlets for this chamber constitute risers having their discharge ends disposed a substantial distance above the bottom of the chamber. Water entering this chamber rises nearly to the top thereof and flows in the direction of the arrows to the outlets 17, during which flow sedimentation occurs. To retard or diminish surface currents each compartment may be provided with one or more baffles 18, as shown in Figs. 1 and 2.

In instances where the raw water is particularly turbid, primary coagulation may be resorted to, in which event proper chemicals will be introduced either in the raw water main or in the preliminary sedimentation basin adjacent to the inlet.

Water thus subjected to this preliminary treatment passes from the sedimentation chamber through outlets 19 into the coagulating basin 11, at which time chemicals are usually introduced to insure proper coagulation. The coagulating basin may be provided with baffles 20 similar to those in the preliminary sedimentation chamber, and while in the present instance the compartments of the basin and chamber are shown as having but a single baffle, it will be understood that more may be provided if necessary. It is also apparent that baffles in these treatment compartments may take the form of radial jutts or plates in any number and in a variety of arrangements to properly govern the course and flow of water.

The compartments of the coagulating basin are provided with outlets 21 located diametrically opposite to the members 19, and have their upper ends disposed a substantial distance above the floor of the basin. These outlets communicate with a main 22 which extends into the pipe vault 14 and is connected with a distributing head or multiple outlet pipe 23 disposed within the pipe vault. After thus being subjected to preliminary sedimentation and coagulation treatments the water is quite free of turbid matter and is in proper condition for filtration.

The pipe 23 is equipped with an outlet 24 to each filter. The filter chamber is provided with a plurality (four in the present instance) of radial bulkheads 25 and P, dividing the chamber into as many filter compartments, with each of which communicates an outlet 24 leading from the distributing element 23.

The construction and operation of the filters form the subject matter of continuing application, Serial No. 187,324, filed January 27, 1938, and so much of the construction and operation of the filters as is necessary to a full and proper understanding of the present invention will now be described.

Each filter includes a support for the filter material, comprising a horizontally disposed grating or screen 27 disposed a substantial distance above the floor of the chamber, preferably taking the form shown in Figs. 1, 2, 5 and 6. The screens as here disclosed cover substantially the entire horizontal area of the filter chamber, and in order to be readily removable are made in sections so shaped and fitted together as to provide a continuous floor for the filter material. Each screen section is formed of spaced substantially parallel slats or bars as shown, the inner end of each section being reduced in width so that the said sections may be fitted together and have their sides in substantially parallel relation from their outer to their inner ends. The slats or bars of the screens may be secured together in any preferred or desired manner, and the said sections are supported upon posts or columns 28 rising from the tank floor and upon ledges or angle irons 29 secured to the tank shell. Graded gravel 30 is arranged in proper depth upon the screens and a bed of finer filter material 31, such as sand, is placed upon the gravel bed. Each filter compartment is provided with a well 32, into which water enters from the outlets 24. The wells, which extend upwardly from the floor of the compartment, are in communication at their upper ends with channels 33 at the inner side of the compartments. A plurality of troughs 34 span the compartments and connect with the said channels. These troughs are arranged above the filter bed and may be provided in any desired number. Water entering the wells 32 from the outlets 24 rises to a predetermined level in the filter compartments and passes onto the filter bed, through which it travels in a downward direction to the space beneath the filter bed. This space is provided with filter effluent pipes or outlets 35 communicating with a pipe 36 leading to a head, standpipe or stack 36' arranged centrally in the pipe vault, from whence water passes through mains 37 leading to the filtered water reservoir 13. The stack as at present is for economy of construction as well as to facilitate chemical treatment of the water before it passes to the reservoir. It will be understood, however, that the stack may be dispensed with and the pipes 36 may communicate either directly with the reservoir or with a suitable head leading to the reservoir.

The flow of raw water through the supply pipe 16 is governed by valves 38, while valves 39 and 40 in pipes 19 and 36 respectively may be similarly employed to regulate or stop the flow. By dividing the plant by partitions or walls P and having independent influent and effluent pipes for the sections formed thereby, it is obvious that one-half only of the plant need be operated at a time, thus facilitating cleaning or repair without stopping operation of the entire plant.

From the filtered water reservoir the water may be led through suitable pipes 41 for either gravity or pump distribution. In the present disclosure the outlet pipes for the filtered water reservoir are for a pump system, and a well or sump 42 is disposed beneath each filtered water compartment so that the inlet to the suction pump will at all times be submerged.

Means is shown in connection with the present plan for washing or cleaning the entire filter plant by simple operations. Water under pressure for washing the filters passes into the plant through pipe 43 where it enters a ring or suitable distributing pipe 44 in the pipe vault. This ring is provided with nozzles or outlets 45 communicating with the bottom of each of the filter chambers; the wash water rising in each chamber through the filter beds in a direction opposite to the flow of water in the filtering process, whereby dirt and other impurities collected in the the same is removed or floated therefrom. This water flows over the upper edges of the radial troughs 34 heretofore referred to, from whence it flows to the channels 33 and down into the well 32. This water passes from the lower part of the well out through pipe 46 and into the waste or main drain pipe 47. The preliminary sedimentation basin, as well as the coagulating basin, is provided with a suitable overflow pipe 48 which also communicates with this main drain or waste pipe. The coagulating basin, preliminary sedimentation chamber and the filtered water reservoir are each provided with bottom outlets 49 which communicate with a waste or drain pipe 50 to facilitate cleaning of these chambers. The filtered water reservoir may also be equipped with an overflow pipe 51 communicating with the waste pipe.

The preliminary sedimentation step may be either included or dispensed with depending upon requirements or local conditions. Should no preliminary sedimentation be necessary, the raw water will be led directly into the coagulating basin from whence it will pass, as heretofore described, through the filter beds and into the filter water reservoir.

It is also recognized that it may not be found expedient to include the filtered water reservoir as an intimate part of the plant as described, in which event the outer or filtered water reservoir here shown may be dispensed with and located at some point more or less remote from the filtering apparatus.

The relative horizontal location of any one of the steps or containers may be interchanged as local requirements or relative capacity may determine as most satisfactory.

Figure 7:
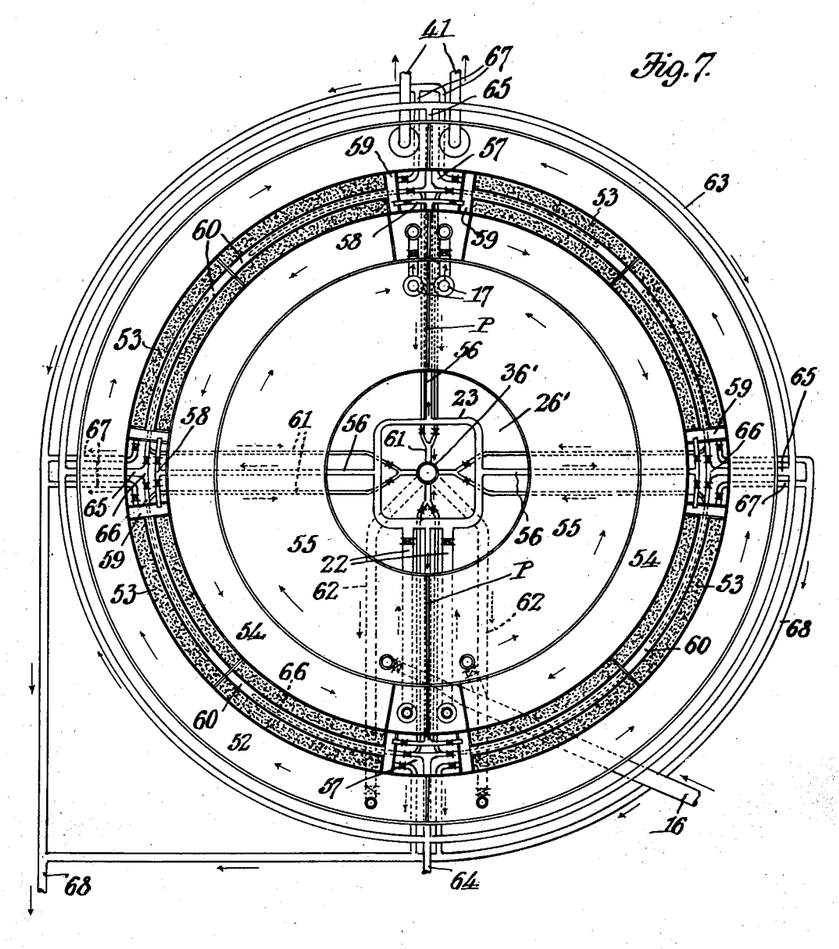
Fig. 7 is a plan view disclosing a modified form of liquid purification plant but involving the same inventive characteristics.

For instance, in Fig. 7 there is shown a modification, wherein the filtered water reservoir is indicated at 52, the filter chambers at 53, the coagulating basin at 54 and the preliminary sedimentation chamber at 55. Raw water enters the compartments for preliminary sedimentation through main supply 16, passes into the coagulating basin through pipes 17, from whence it flows through pipes 22 to ring 23 in the central pipe vault 26'. This ring is equipped with effluent pipes 56 corresponding to the number of filters employed. Each filter chamber is provided with a pipe vault 57 into which the outer ends of the influent pipes project and a T 58 at the extremity of each of said pipes leads water into wells 59 arranged within the filter chamber. These wells each communicates with an arcuate wash water trough 60 in the filter bed, from which the water overflows and passes downwardly through the filter material and out of the filter chambers through pipes 61 to the central stack 36'. Mains 62 lead the water from this stack to the filtered water reservoir 52, from whence it is distributed through mains 41.

The apparatus of this form of the invention is provided with a wash water ring 63, to which water is led through the wash water supply pipe 64. Branch pipes 65 from the ring lead wash water into the bottom of each filter compartment through a T 66; the latter having its arms disposed beneath the arcuate trough 60. The wash water rises through the filter beds carrying with it all accumulated matter and drains through pipes 67 communicating with main drain 68.

In this form of the invention control houses are to be positioned over the vaults 57, and over the central pipe vault may be erected the head house to contain a laboratory, all chemical feeding apparatus as well as controls for the various valves governing the flow of water through the plant.

The grouping of all or separate parts of the water treatment apparatus in a unitary structure accomplishes economy of space and structural materials as well as costs of operation. An important feature of the invention, therefore, is the arrangement of component parts of two or more liquid treating apparatus in enveloping form or one within the other.

The foregoing is a description of the invention as used in water purification, but it is obvious that with minor alterations the device may be employed in sewage treatment and in the treatment of heavier polluted liquids, such as industrial waste, etc.

While the present is a description of the preferred embodiments of the invention, it is apparent that the inventive characteristics may equally as well be exemplified in a variety of modifications, and the right is reserved to resort to such variations as may fall within the scope of the claims.

Having thus described my invention, I claim:—

1. In a liquid purification plant, a series of liquid treatment basins and a reservoir arranged one within another, a collecting head, a communication between one of said basins and said head, and a communication between said head and said reservoir.

2. In a liquid purification plant, a pair of liquid treatment basins and a pipe vault arranged one within another, means for leading liquid from one of said basins to said vault, means for leading liquid from said vault to the other of said basins, and means for leading liquid from said other basin back into said vault.

3. In a liquid purification plant, a pipe vault, a plurality of filters, a distributing head in said vault, means to lead liquids from said head to each of said filters, a filtered water reservoir and means to lead liquid from said filters to said reservoir, a wash water ring in said vault, outlets leading from said ring to said filters, and drains for said filters.

4. In a liquid purification plant, a preliminary sedimentation basin, a coagulating chamber, a filter basin and a filtered water reservoir, a pipe vault, a pipe leading from said preliminary sedimentation basin to said coagulating chamber, a distributing head in said vault, a pipe leading liquid from said coagulating basin to said head, pipes leading liquid from said head to said filter chamber, a stack, means to lead liquid from said filter chamber to said stack, and a connection between said stack and said filtered water reservoir.

5. In a liquid purification plant, sedimentation, coagulating, and filter basins, a pure liquid reservoir and a pipe vault all arranged one within another, means for leading liquid from said sedimentation to said coagulating basin, means for leading liquid from said coagulating basin through said vault to said filter basin, means for leading liquid from said filter basin through said vault to said reservoir, a wash water distributing head in said vault, means for leading wash water from said vault through said filter basin, and means for leading said wash water back into said vault.

6. In a liquid purification plant, coagulating and filter basins and a pipe vault arranged one within another, means for leading liquid from said coagulating to said filter basins, means for leading liquid from said filter basin to said vault, a filtered water reservoir, and means for leading liquid from said vault to said reservoir.

7. In a liquid purification plant, sedimentation, coagulating and filter basins and a pipe vault arranged one within another, means leading liquid from said sedimentation to said coagulating basins, means leading liquid from said coagulating to said filter basin, means for leading liquid from said filter basin to said vault, a filtered water reservoir, and means for leading liquid from said vault to said reservoir.

8. In a liquid purification plant, a plurality of liquid treatment chambers and a pipe vault arranged one within another, means to supply wash water to certain of said chambers, wash water drains for said chambers, and means within said vault to govern the flow of liquid through said drains.

9. In a liquid purification plant, a plurality of water treatment basins, a filtered water reservoir and a pipe vault arranged one within another, means establishing communication between various of said basins and between one of said basins and said reservoir, and means within said vault to govern the flow of liquid between said basins.

10. In a liquid purification plant, coagulating and filter basins and a pipe vault arranged one within another, communications between said basins, a filtered water reservoir, a communication between one of said basins and said reservoir, and means operable from said vault for controlling the flow between said basins and between one of said basins and said reservoir.

11. In a liquid purification plant, coagulating and filter basins and a pipe vault arranged one within another, means for leading liquid from said coagulating to said filter basins, means for leading liquid from said filter basin to said vault, a wash water supply in said vault, means for leading water from said supply to said filter basin, a drain for said basin, a filtered water reservoir, and means for leading filtered water from said vault to said reservoir.

12. In a liquid purification plant, coagulating and filter basins and a pipe vault arranged one within another, means for leading liquid from said coagulating to said filter basins, a pure water reservoir and means for leading liquid from said filter basin to said reservoir, a source of wash water supply in said vault, means for leading water from said source to said filter basin, and a drain for said filter basin.

13. In a liquid purification plant, a plurality of liquid treatment chambers and a pipe vault arranged one within another, a collecting head in said vault to receive liquid from one of said chambers, a distributing element in said vault to transfer liquid from one to another of said chambers, a source of wash water supply in said vault, means to lead water from said source to certain of said chambers, and drains for said chambers leading back into said vault.

14. In a liquid purification plant, a plurality of walls arranged in spaced relation and one within another to provide between them sedimentation, coagulating basins and a pure water reservoir closed at their bottoms and entirely separate from one another, a filter, a communication between said sedimentation and coagulating basins, a communication between said coagulating basin and said filter, a communication between said filter and said pure water reservoir, and means whereby the flow of liquid through said several communications may be governed.

15. In a liquid purification plant, liquid treatment basins closed at their bottoms separate from and arranged one within another, a collecting head, a communication between one of said basins and said head, and a communication between said head and another of said basins.

16. In a liquid purification plant, a plurality of liquid treatment basins closed at their bottoms, a collecting head, said basins and head arranged one within another, a communication between one of said basins and said head, and a communication between said head and another of said basins.

17. In a liquid purification plant, a plurality of liquid treatment chambers and a pipe vault all arranged in concentric order with the pipe vault innermost, a wash water distributing pipe within said vault, means for leading wash water from said pipe to certain of said chambers, and drains for said chambers.

18. In a liquid purification plant, a plurality of liquid treatment chambers and a pipe vault arranged in concentric order with the pipe vault innermost, a wash water pipe in said vault, means for leading wash water from said pipe to certain of said chambers, drains for said chambers, and said drains leading back into said vault.

19. In a liquid purification plant, sedimentation, coagulating and filter basins arranged one within another, means for leading liquid from the upper part of the sedimentation basin to the upper part of the coagulating basin, means for leading liquid from the upper part of the coagulating basin to the upper part of the filter basin, a filter bed in the latter basin through which the liquid passes to the lower part of said filter basin, a pure water reservoir, and a communication between the lower part of said filter basin and said reservoir.

20. In a liquid purification plant, a filter basin, a pipe vault, a liquid distributing element in said vault, means whereby liquid may be delivered by said element to said basin, a wash water ring in said vault, means whereby wash water may be caused to flow from said ring to said basin, and a drain for said basin.

21. In a liquid purification plant, a plurality of liquid treatment chambers and a pipe vault and a pure water reservoir, a distributing head in said vault, pipes establishing communication between one of said chambers and said head, pipes establishing communication between said head and another of said chambers, a stack in said vault, pipes establishing communication between the last named chambers and said stack, communications between said stack and said reservoir, a wash water ring in said vault communicating with certain of said chambers, drain pipes for said chambers leading into said vault, and a waste pipe to receive water from said drain pipes.

22. In a liquid purification plant, a series of liquid treatment basins arranged one within another, a wall dividing said basins into pairs of compartments, a reservoir, a collecting head, communications between the compartments of one pair and said head, a communication between said head and said reservoir, and means whereby the flow of liquid to and from the compartments of certain pairs may be stopped without affecting the operation of the remaining compartments.

23. In a liquid purification plant, a series of liquid treatment basins and a pure water reservoir arranged one within another, a wall dividing said basins and reservoir into pairs of compartments, a collecting head, communications between the compartments of one pair of liquid treatment basins and said head, separate communications between said head and the compartments of said reservoir, and means whereby the flow of liquid to and from the compartments of certain pairs may be stopped without affecting the flow to and from other compartments.

24. In a liquid purification plant, a plurality of liquid treatment basins and a reservoir, a wall dividing said basins and reservoir into separate compartments, a head, communications between the treatment compartments on each side of said wall and said head, communications between said head and both compartments of said reservoir, and valves in said various communications whereby the flow of liquid to and from the liquid treatment and reservoir compartments on one side of said wall may be stopped without affecting the operations of the compartments of the other side.

25. In a liquid purification plant, a plurality of liquid treatment basins and a pipe vault arranged one within another, a wall dividing said basins into separate pairs of compartments, means for leading liquid from the compartments of one of said pairs to said vault, means for leading liquid from said vault to compartments of another pair, means for leading liquid from the last mentioned compartments back into said vault, and valves controlling said liquid leading means whereby the compartments on one side of said wall may be rendered inoperative without affecting the operations of the compartments on the opposite side thereof.

ROBERT B. MORSE.